Oct. 30, 1962  G. L. EADS ET AL  3,060,835
AUTOMATIC COFFEE BREWER
Filed Jan. 31, 1958  2 Sheets-Sheet 1
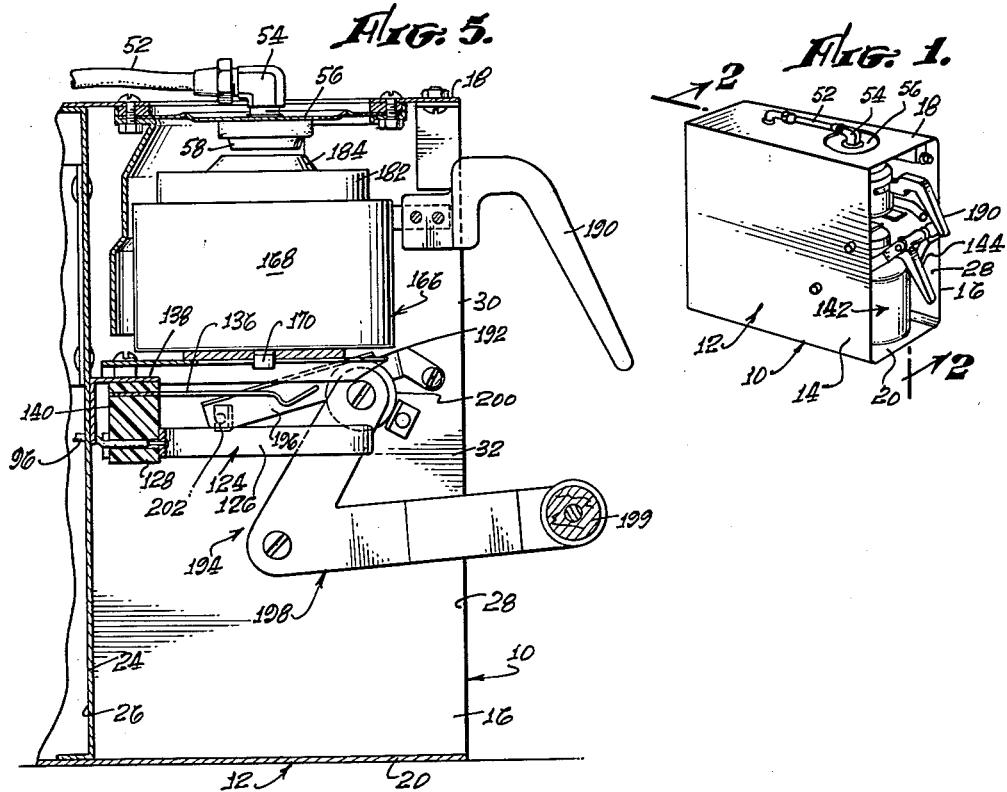
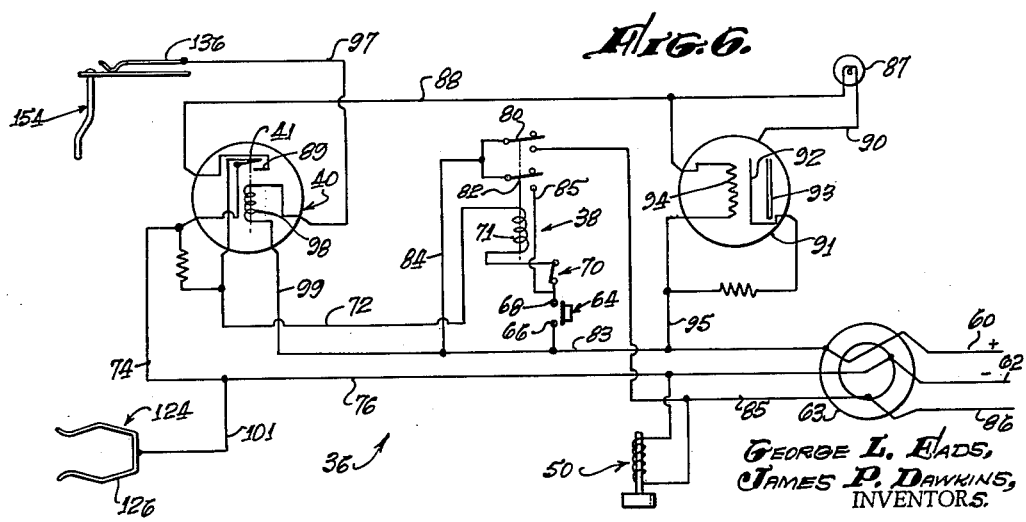
GEORGE L. EADS,
JAMES P. DAWKINS,
INVENTORS.
BY Thomas P. Maloney
ATTORNEY Oct. 30, 1962  G. L. EADS ET AL  3,060,835
AUTOMATIC COFFEE BREWER
Filed Jan. 31, 1958  2 Sheets-Sheet 2

GEORGE L. EADS,
JAMES P. DAWKINS,
INVENTORS.

BY Thomas P. Mahoney
ATTORNEY

United States Patent Office 3,060,835
Patented Oct. 30, 1962

1

3,060,835
AUTOMATIC COFFEE BREWER
George L. Eads and James P. Dawkins, Los Angeles, Calif., assignors, by mesne assignments, to Coffee Equipment, Inc., Los Angeles, Calif., a corporation of California
Filed Jan. 31, 1958, Ser. No. 712,412
15 Claims. (Cl. 99—283)

This invention relates to an automatic coffee brewer having particular application for use in various types of vehicles engaged in public transportation such as busses, airplanes, and the like. This application is a continuation-in-part of Serial No. 626,193, filed December 4, 1956, now abandoned.

It is well known to those skilled in the art of coffee brewing that the characteristic flavor, aroma and bouquet of coffee can only be obtained by freshly brewing coffee and that those desirable qualities are diminished or lost by the conventional expedients of transporting coffee in Thermos flasks or by utilization of powdered coffee or the like.

However, it has been found impracticable to resort to conventional methods of brewing coffee in public transportation vehicles because of the danger of spilling the coffee and the complexities involved in the utilization of the conventional methods of brewing the same.

It is, therefore, an object of our invention to provide a coffee brewer which is characterized by its relatively small size and compact housing so that it can be easily and readily installed in a selected location in the pantry of a transport vehicle such as an aircraft and whereby the amount of space allotted to the brewer need not be as large as that which would be occupied by a conventional commercial coffee brewer.

Hostesses, stewards and others who prepare the food and beverages on transport vehicles are frequently occupied by other matters and are not able to supervise the preparation of coffee by a conventional coffee means. Another object of our invention is the provision of a coffee brewer of the aforementioned character which is completely automatic in its operation and which will, when the brewing of the coffee has been completed, generate a signal visible to the hostess or steward whereby said hostess or steward will know that the brewing process has been completed and the coffee in the brewer is ready to be served.

Another object of our invention is the provision of a coffee brewer of the aforementioned type which incorporates a housing having means provided therein for locking a coffee-containing decanter in place and which also includes means for maintaining a container in operative relationship with said decanter whereby the said container may receive coffee brewed in the decanter and whereby said container may be removed from said housing to permit said coffee brew to be distributed therefrom.

A further object of our invention is a coffee brewer of the aforementioned character which is particularly adapted for use in vehicles because of the provision in the aforementioned container of means for suppressing the turbulence in the pool of coffee within the container so that control circuit utilized to limit the flow of coffee will not be prematurely energized by such turbulence in the pool of coffee prior to the adequate filling of the container therefor.

Another object of our invention is the provision in a coffee brewer of the aforementioned type of an electronic control circuit which, when initially energized, automatically determines the point at which the further flow of coffee brew into the associated container from the decanter shall terminate, and whereby the entire de-energization of the coffee brewing process is controlled directly from the pool of coffee within the container itself.

Other objects and advantages of our invention will be apparent from the following specification and accompanying drawings, which are for the purpose of illustration only and in which:

FIG. 1 is a perspective view showing a coffee brewer manufactured in accordance with the teachings of our invention;

FIG. 5 is a view similar to FIG. 2 showing the mode of operation of the decanter retaining means; and FIG. 6 is a circuit diagram of the electronic circuit utilized in controlling the brewing of coffee by the coffee brewer of our invention.

Figure 2:
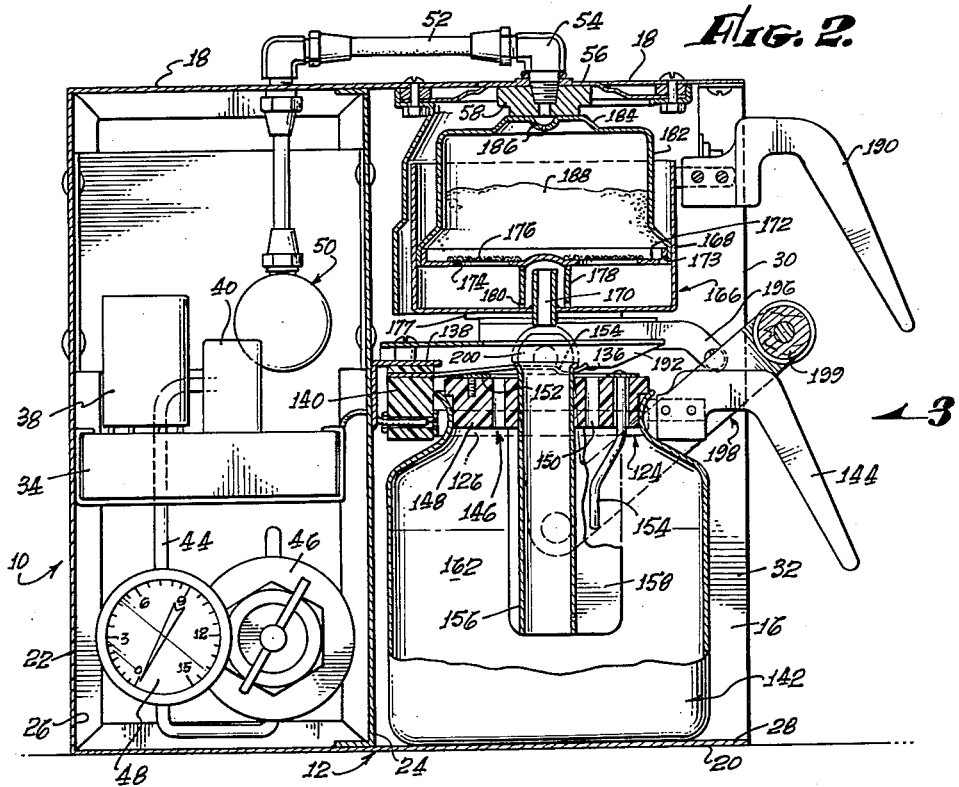
FIG. 2 is a vertical sectional view taken on the broken line 2—2 of FIG. 1.
Figure 3:
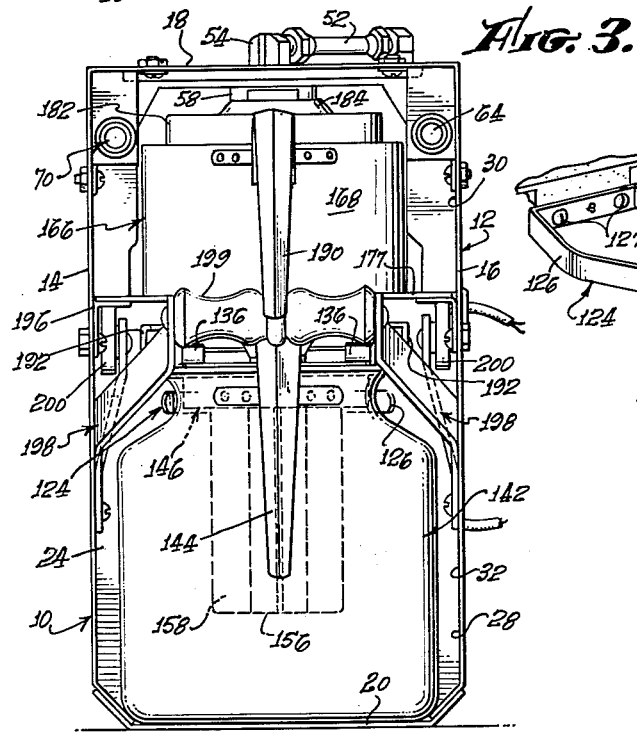
FIG. 3 is a front elevational view taken from the direction of the arrow 3 in FIG. 2.
Figure 4:
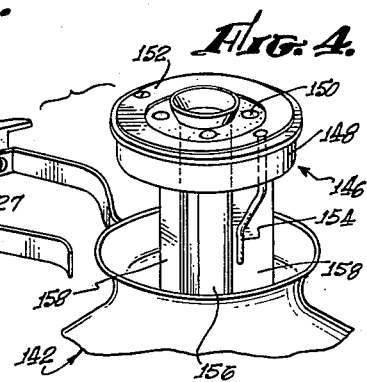
FIG. 4 is a perspective view of the cover for the container utilized in conjunction with the coffee brewer of our invention.

Referring to the drawings, and particularly to FIGS. 1-3 thereof, we show an automatic coffee brewer 10, said automatic coffee brewer being adapted for use in public transportation vehicles such as aircraft, trains, busses and the like and including a substantially rectangular sheet metal housing 12 which is disposable in a suitably shaped opening in the location in which the automatic coffee brewer 10 is utilized.

The housing 12 includes side walls 14 and 16 joined in operative relationship by top and bottom walls 18 and 20, respectively. Also provided is an end wall 22 which, as best shown in FIG. 2 of the drawings, serves, in conjunction with an intermediate partition 24, to define a compartment 26 for the reception of various elements of the coffee brewer control mechanism, which will be described in greater detail below.

The other end of the housing 12 is open and there is defined on the other side of the partition 24 a second compartment 28 which is subdivided into an upper decanter receiving chamber 30 and a lower container receiving chamber 32.

As previously indicated, the housing 12 of the automatic coffee brewer 10 is formed from sheet metal and, for purposes of sanitation, we have found that the utilization of stainless steel is most desirable. The exterior of the housing 12 is characterized by the absence of an excessive number of protrusions which might prevent the reception of the automatic coffee brewer 10 in a recess in the vehicle in which its use is contemplated.

Located in the first compartment 26, as best shown in FIG. 2 of the drawings, is a chassis 34 which supports the various components of the control circuit 36, best shown in FIG. 6 of the drawings, including a holding relay 38 and a de-energizing relay 40.

The automatic coffee brewer 10 is connected to a source of hot water by means of a conduit 44, said conduit, as best shown in FIG. 2 of the drawings, incorporating a pressure regulating valve 46 and a pressure gage 48 whereby the pressure of the water flowing through the conduit 44 may be determined and regulated.

Connected in the conduit 44 is a solenoid hot water valve 50 which can be energized or de-energized by means of the control circuit 36, in a manner to be described in greater detail below, in order to initiate or terminate the flow of water through a line 52 to an outlet nozzle 54 mounted in a flexible diaphragm 56 located in the top wall 18 of the housing 12. The outlet nozzle 54 is operatively associated with a pressure pad 58 mounted on the underside of the diaphragm 56, for a purpose which will be described in greater detail below.

The electrical control circuit 36 is connected to a source of 28 volt D.C. potential by means of leads 60 and 62 and a plug 63, as best shown in FIG. 6 of the drawings. The energization of the control circuit 36 is accomplished by the closing of a starter switch 64, one contact 66 of which is connected to the lead 60 through the plug 63 and the other contact 68 of which is connected through a normally closed stop switch 70 to the coil 71 of the holding relay 38. The other side of the coil of the relay 38 is connected by a lead 72 through the normally closed contact 41 of the relay 40 to leads 74 and 76 and, thus, to the input lead 62.

The relay 38 includes normally open contacts 80 and 82 and when the coil 71 of the relay 38 is engaged by the closing of the starter switch 64 to close the normally open contact 82 of said relay, a holding circuit is made, after the starter switch 64 is released, from the input lead 60 through the plug 63, leads 83 and 84, through the contact 82, a lead 85, stop switch 70, the coil 71, lead 72, the relay 40, and leads 74 and 76 to the input lead 62.

After the energization of the relay 38 in the above described manner, the normally open contact 80 of said relay makes a circuit through leads 83 and 84 with input lead 60 and through a lead 85 and the plug 63 to a lead 86 which is connected to a relay, not shown, to energize a water pump, not shown, for pumping water to the valve 50.

Also incorporated in the circuit 36 is an indicator light 87 which is connected by means of a lead 88 to a normally open contact 89 of the relay 40 and connected on its other side through a lead 90 to a thermostatic switch 91. The thermostatic switch includes contacts 92 and 93 adapted to be energized by the action of a heater 94 which is connected in a lead 95 extending between the lead 88 and the lead 83. The energization of the signal light 87 by the switch 91 will be described in greater detail below.

The control circuit 36 includes two electrodes 124 and 154, the electrode 154 being connected by a lead 97 to the coil 98 of the relay 40, the other side of said coil being connected by a lead 99 and the lead 83 to the input plug 63. The electrode 124 is connected by a lead 101 and the lead 76 through the plug 63 to the input lead 62.

The first terminal of the control circuit 36 is constituted by the electrode 154, in a manner to be described hereinbelow, which is electrically connected to a pair of conductive leaf springs 136 which are isolated from a mounting bracket 138 upon which they are supported from the partition 24 by means of an insulating block 140. The electrode 124 is constituted by a U-shaped, spring steel clip 126 which is mounted, by means of screws 127, on a block 140 secured to the bracket 138 and which is connected to the lead 101, said electrode 124 constituting the second terminal of the circuit.

A metallic container 142 for coffee brew is provided with a handle 144 and is insertable in the lower chamber 32 in the manner shown in FIGS. 1 and 2-3 of the drawings. However, prior to insertion of the container 142 in operative relationship with the automatic coffee brewer 10, a closure or cover 146 is mounted in the opening thereof, said closure including a substantially cylindrical body 148 formed from a dielectric plastic or the like, said body being provided with a plurality of vertical bores 150 adapted to permit the release of vapor and air from the interior of the container 142. Mounted upon the upper surface of the body 148 is a conductive contact ring 152, said ring having an electrode 154 electrically engaged therewith and depending from the underside of the body 148.

Mounted centrally of the body 148 is a fluid conducting tube 156 which has radiating, turbulence suppressing fins 158 supported thereupon, said fins being adapted to prevent the splashing of coffee brew within the container 142 and thus eliminating the possibility that the coffee brew might prematurely engage the electrode 154 and thus de-energize the electronic control circuit 36, in a manner to be described in greater detail below. The lower extremity of the electrode 154, as best shown in FIG. 2 of the drawings, is so located that it will engage the top of a pool 162 of coffee brew within the container 142 when the pool 162 reaches a predetermined height within the container 142.

When the container 142 is inserted in the lower chamber 32 in the housing 12 of the automatic coffee brewer 10, the leaf springs 136 engage upon the cover or closure 146 thus making electrical contact with the contact ring 152 and aiding in holding the container 142 in operative relationship with the chamber 32 in the housing 12. In this manner an electrical circuit is made with the electrode 154 and the electrode is electrically connected with the terminal lead 97 and, thus, in the control circuit 36. Moreover, the electrode 124 constituted by the U-shaped clip 126 engages the neck of the container 142 in the manner shown in FIGS. 2 and 3 of the drawings to place said container in the control circuit 36.

Therefore, when the pool 162 of coffee brew reaches the level shown in FIG. 2 of the drawings wherein the lower extremity of the electrode 154 engages the pool 162, a circuit is made between the first terminal constituted by the electrode 154 and the second terminal constituted by the electrode 124 of the control circuit 36 to automatically cause the cessation of flow of heated water to a brewing decanter 166 mounted in the upper chamber 30 of the housing 12. The making of the circuit between the electrodes 124 and 154 through the pool 162 energizes the coil 98 of the relay 40 shifting the contact 41 thereof and breaking the circuit to the holding relay 38. When this occurs, the normally open contact 80 returns to its original position which de-energizes the solenoid valve 50 and terminates the continued flow of hot water through the brewer 10. Simultaneously, the heater 94 of the switch 91 is energized and begins to heat the thermostatic switch element 92 which controls ignition of the signal light 87 which indicates completion of the brewing cycle. Thus, ignition of the light 87 is delayed until a period of time sufficient to permit completion of flow of residual water through the brewer 10 has elapsed so that removal of the container 142 will not be attempted until the flow of coffee brew thereinto is completed.

The brewing decanter is constituted by a substantially cylindrical lower portion 168, said lower portion being provided, as best shown in FIG. 2 of the drawings, with a centrally located tube 170. Disposable within the lower portion 168 of the decanter 166 is an annular plate 172 provided with a plurality of outlet orifices 174 which are covered with fine mesh screens 176. A plate 177 is secured to the base of the lower portion 168 of said decanter and constitutes a support by extending transversely of the lower portion 168 to engage upon supporting arms 192 as described hereinbelow.

The plate 174 has mounted upon the central portion thereof a depending tubular element 178 which overlies the upstanding tube 170 in the lower portion 168 of the decanter 166 and which is provided with radial ports 180 which permit flow of coffee brew through the openings 174 into the interior of the tubular element 178 and thus through the tube 170 and into the tube 156 in the closure or cover 146.

The annular plate 172 is provided with an upstanding flange 173 and the upper portion 182 of the decanter 166 is disposed in overlying relationship with the flange, as best shown in FIG. 2 of the drawings. Formed integrally with the top wall of the upper portion 182 of the decanter 166 is a centrally located boss 184 adapted to engage the pressure pad 58, in a manner to be described in greater detail below, said boss being provided with a plurality of openings 186 to permit the flow of heated water from the nozzle 54 into the interior of the decanter 166. A supply of ground coffee 188 is disposed within the upper portion 182 of the decanter 166 and is thus exposed to heated water through the openings 186 in the boss 184. Thus, as hot water flows over the ground coffee and therethrough, it will pass through the screened openings 174 in the annular plate 172 and thence through the radial ports 180 in the tubular element 178 and out the tube 170. The coffee brew then flows into the interior of the container 142 through the tube 156 which is supported upon the cover or closure 146. It will be noted that a handle 190 is provided on the lower portion 168 of the decanter 166 to facilitate the insertion thereof in the brewer 10.

When the decanter 166 is first inserted in the upper chamber 30, as best shown in FIG. 5 of the drawings, it initially rests upon supporting arms 192 which are mounted on the supporting bracket 138. When located in this position the boss 184 on the upper portion 182 of the decanter 166 is spaced from the pressure pad 58 mounted on the diaphragm 56 of the housing 12, as best shown in FIG. 5 of the drawings.

In order to carry the decanter 166 upwardly to engage the boss 184 upon the pressure pad 158, carriage means 194 is provided for the decanter 166, said carriage means being constituted by a pair of pivotally mounted arms 196 supported on the side walls 14 and 16 of the housing 12. The arms 196 are normally disposed in a first lower position, shown in FIG. 5 of the drawings, and are urged upwardly by the action of bellcranks 198 pivotally mounted therebelow, said bellcranks being connected by a handle 199 and each of said bellcranks being provided upon the upper extremity thereof with an engagement roller 200. Each of the engagement rollers 200 is adapted to engage the underside of an associated pivotally mounted arm 196 in the manner shown in FIG. 5 of the drawings. Stops 202 are mounted on the interior of the side walls 14 and 16 to limit movement of the bellcranks 198 by engagement therewith.

Therefore, when the decanter 166 is initially inserted in the upper chamber 30 in the position shown in FIG. 5 of the drawings, the plate 177 on the lower portion 168 rests upon the supporting arms 192. However, upward movement of the handle 199 from the position of FIG. 5 to the position of FIG. 2 causes inward movement of each of the bellcranks 198 and their associated rollers 200, causing simultaneous upward movement of the pivotally mounted arms 196 which, as best shown in FIGS. 2 and 3 of the drawings, carry the decanter 166 upwardly and bring the boss 184 into engagement with the pressure pad 58 thus deflecting the diaphragm 56 upwardly and establishing positive and fluid-tight engagement of the pressure pad 58 with the boss 184.

After the decanter 166 has been so located in operative relationship with the automatic coffee brewer 10, the container 142 with its associated closure 146 is inserted in the lower chamber 32 and the contact ring 152 engages the leaf springs 136 thus causing an electrical circuit to be made with the probe 154. When the decanter 166 and the container 142 are located in the automatic coffee brewer 10 in the above described manner, the brewing cycle can be initiated.

When the decanter 166 and the container 142 are located in operative relationship with the automatic coffee brewer in the above described manner, the depression of the starter switch 64 will initiate the brewing cycle by causing the energization of the relay 38 to cause the holding contact 82 thereof to maintain the coil 71 self-energized while simultaneously causing the contact 80 thereof to energize the various components of the control circuit 36.

As previously indicated, depression of the starter switch 64 and energization of the relay 38 are accompanied by the opening of the control valve 50 which permits hot water to flow through the decanter 166 and the ground coffee 188 therein permitting coffee brew to flow downward into the container 142. During this process, the second terminal 124 of the electronic control circuit 36 is in continual electrical contact with the pool 162 of coffee brew because of the electrical contact of the clip 126 with the metallic container 142.

The flow of heated water to the decanter and thence into the container will continue until the first terminal 154 engages the pool 162 of coffee brew within the container 142. When this occurs, a circuit is made between the terminal 124 and the terminal 154 which causes the coil 98 of the relay 40 to be energized, breaking the circuit to the holding relay 38. This results in return of contacts 80 and 82 to open position which closes the valve 50 to terminate the flow of heated water. At the same time, the heater 94 of the switch 91 is energized and the light 87 will be subsequently ignited to give a visual indication of the completion of the brewing cycle.

Once the signal light 87 is energized, the container 142 can be removed from operative relationship with the housing 12 and the closure 146 associated therewith is dismounted from the container 142 prior to serving therefrom. Until the container 142 is removed from operative relationship with the housing 12, the decanter 166 cannot be removed from the upper chamber 30 because the handle 144 of the container 142 is disposed in the path of movement of the handle 199 of the decanter carriage 194, thus preventing the release of the decanter 166 while the container 142 is in operative relationship with the housing 12.

We thus provide by our invention an automatic coffee brewer which is characterized by the ease with which it may be utilized in various types of public transport vehicles. Also characteristic of our invention is the fact that both the brewing decanter and the container for the coffee brew are positively associated with the brewer during the brewing operation to prevent the possibility of inadvertent displacement of the decanter or coffee brew from operative relationship therewith.

We claim:

1. In a coffee brewer, the combination of: a housing; said housing having top and bottom walls joined by upright walls; an electrically conductive coffee pot disposed in said housing on said bottom wall; a control circuit having a first terminal; a cover for said pot from which said first terminal is suspended in said pot; a second terminal extending from one of said upright walls of said housing engageable with the exterior of said pot; means in said housing between said top wall and said pot in fluid communication with said pot for brewing coffee and filling said pot with said coffee; and a contacting element on one of said upright walls of said housing engageable with said first terminal for making a circuit between said terminals when said coffee reaches a predetermined height in said pot.

2. In an apparatus for automatically limiting the height of a fluid pool, the combination of: an electrically conductive container for said fluid having an opening at its upper extremity; a control circuit having a first terminal; a removable cover for said container mounted in said opening and supporting said first terminal within said container and in insulated relation thereto; said cover having an opening therethrough for passing liquid into said container; a second terminal of said control circuit embracing and electrically contacting said container; and a contact on said cover and in electrical engagement with said first terminal to make a circuit between said terminals when said pool reaches a predetermined height in said container.

3. In a coffee brewer, the combination of: a housing; a fluid coffee container in said housing; a valve controlled source of water; means in said housing for locking a coffee grounds containing decanter in fluid communication with said source; and a cover insertible in said container in fluid communication with said decanter, said cover having baffle means thereupon depending into said container whereby turbulence within said container will be prevented.

4. In a coffee brewer for vehicles, the combination of: a housing having top and bottom walls joined by upright walls; a source of water accessible at one of said walls; a valve controlling flow from said source; an electrically conductive container supported on said bottom wall; a coffee brewing decanter beneath said top wall; means carried by said top wall for maintaining said decanter in fluid communication with said source; a cover for said container; and a control circuit for said valve including a first terminal carried by said cover so as to be insulated from and disposed within said container and a second terminal mounted on one of said upright walls and disposed in contact with the exterior of said container.

5. In a coffee brewer for vehicles, the combination of: a housing having a top wall and a bottom wall joined by upright walls; a source of water in said housing accessible on one of said walls; a valve controlling flow from said source; a coffee brewing decanter supported on said top walls; means in said housing between said upright walls for maintaining said brewing decanter in fluid communication with said source; an electrically conductive container supported on said bottom wall in fluid communication with said decanter; a control circuit for said valve including a first terminal; a cover for said container supporting said first terminal in said container; a second terminal mounted on one of said upright walls of said housing in conductive relationship with said container; and a contact supported by said one upright wall and extending over said cover for electrical communication with said first terminal.

6. In a coffee brewer for vehicles, the combination of: a housing; a source of water in said housing; a valve controlling flow from said source; means in said housing for maintaining a coffee containing decanter in fluid communication with said source; a container in said housing having a cover thereupon; and a control circuit for said valve including a first terminal mounted in said cover and a second terminal mounted on said housing, said cover having a conductor mounted thereupon and depending into said container and electrically connected to said first terminal, said cover having a plurality of baffles to prevent turbulence in said coffee brew.

7. In a coffee brewer, the combination of: a housing; a coffee brewing decanter; said housing having a wall opposite said decanter; outlet means affording a flow of water into said decanter; resilient means on said wall yieldably supporting said outlet means; said housing having a bottom wall; means in said housing for locking said decanter in fluid communication with said said outlet means and including a carriage movable with relation to the walls of the housing for engaging said decanter against said outlet means; and a container for coffee brew supported on said bottom wall in fluid communication with said decanter.

8. In a coffee brewer, the combination of: a housing; said housing having top and bottom walls and upright walls joining said top and bottom walls; an outlet on said top wall for discharging water; means in said housing supported between said upright walls for initially supporting a coffee brewing decanter in said housing; an elevating carriage operable on said upright walls of said housing adapted to lift said decanter off said initial supporting means and urge it against said outlet; and means on one of said upright walls of said housing for holding on said bottom wall a container for coffee brew in fluid communication with said decanter.

9. In a coffee brewer, the combination of: a housing; said housing having top and bottom walls joined by upright walls; a resiliently mounted outlet for water connected to said top wall; means operatively connected with said upright walls for locking a coffee brewing decanter in flued communication with said outlet and including a carriage movable toward said top wall to urge said decanter against said outlet and displace the same; and means in said housing for holding a container for coffee brew on said bottom wall and in fluid communication with said decanter including a resilient yoke on one of said upright walls.

10. In a coffee brewer, the combination of: a housing; a valve controlled source of water having an outlet communicating with the interior of said housing; a fixed support in said housing for initially supporting a coffee containing decanter in said housing; an elevating carriage engageable with said decanter to lift it from said fixed support and urge it against said outlet; and means in said housing for holding a container for coffee brew in fluid communication with said decanter including a resilient yoke mounted in said housing.

11. In a coffee brewer, the combination of: a housing; a valve controlled source of water having an outlet communicating with the interior of said housing; means in said housing for locking a coffee containing decanter in fluid communication with said source, said means including a pair of pivotally mounted arms urgeable against said decanter to carry it upwardly against said outlet and a handle positioned externally of said housing for actuating said arms; means in said housing for holding a container for coffee brew in fluid communication with said decanter including a spring clip mounted in said housing; and a cover mounted in said container engageable by said last mentioned means.

12. In a coffee brewer for vehicles, the combination of: a housing having top and bottom walls joined by upright walls; a resiliently mounted outlet for water disposed between said upright walls and adjacent said top wall; a valve in said housing controlling flow from said outlet; means in said housing for maintaining a coffee brewing decanter in fluid communication with said outlet including a carriage movably supported between said upright walls; means for moving said carriage toward said top wall to move said decanter upwardly against said outlet and displace the same; and means supported between said upright walls for releasably holding a container for coffee brew on said bottom wall and in fluid communication with said decanter.

13. In a coffee brewer for vehicles, the combination of: a housing having top and bottom walls joined by upright walls; a source of water having a resiliently mounted outlet in said housing on said top wall; a valve in said housing controlling flow from said outlet; means in said housing for maintaining a coffee brewing decanter in fluid communication with said outlet including a pair of pivotally mounted arms supported on said upright walls for urging said decanter upwardly into locked engagement with said outlet; and means in said housing carried by one of said upright walls for holding a container for coffee brew on said bottom wall and in fluid communication with said decanter.

14. In a coffee brewer for vehicles, the combination of: a housing; a source of water having an outlet in said housing; a valve controlling flow from said source; a fixed support in said housing for initially supporting a coffee containing decanter in said housing; a movable carriage in said housing having means for lifting said decanter from said fixed support and urging it against said outlet; and means in said housing for holding a container for coffee brew in fluid communication with said decanter including a spring clip within said housing.

15. In coffee brewing apparatus; a coffee brewing decanter; a container for coffee brewed in said decanter; a cover removably mounted on said container; said brewing decanter having a spout through which brewed coffee is discharged; an intake spout carried by said cover with its upper end above the cover and its lower end within said container; means supporting said brewing decanter and said container with said discharge spout opposite and in line with said intake spout so that brewed coffee may be introduced from said discharge spout into said intake spout; and a plurality of fins extending radially outwardly from and along that portion of said intake spout below said cover to reduce the turbulence of brewed coffee in said container; said cover having a vent opening extending therethrough.

References Cited in the file of this patent

UNITED STATES PATENTS

| Number | Name | Date |
|---|---|---|
| 465,049 | Puffer | Dec. 15, 1891 |
| 563,464 | Fahrney | July 7, 1896 |
| 585,264 | Fahrney | June 29, 1897 |
| 647,145 | Meyer | Apr. 10, 1900 |
| 1,149,913 | Hipwell | Aug. 10, 1915 |
| 1,346,898 | Kingsbury | July 20, 1920 |
| 1,394,643 | Reichart | Oct. 25, 1921 |
| 1,549,840 | Lemoine | Aug. 18, 1925 |
| 1,903,111 | Harper | Mar. 28, 1933 |
| 1,938,174 | Davis | Dec. 5, 1933 |
| 1,976,768 | Boileau | Oct. 16, 1934 |
| 2,057,430 | Herrera | Oct. 13, 1936 |
| 2,201,545 | Mazzanobile | May 21, 1940 |
| 2,319,075 | McKinnis | May 11, 1943 |
| 2,340,203 | Morse | Jan. 25, 1944 |
| 2,484,054 | Sharp | Oct. 11, 1949 |
| 2,551,219 | Peters | May 1, 1951 |
| 2,554,367 | Karlen | May 22, 1951 |
| 2,558,062 | Selzer | June 26, 1951 |
| 2,615,384 | Ranz | Oct. 28, 1952 |
| 2,639,078 | Karlen | May 19, 1953 |
| 2,737,880 | Johnson | Mar. 13, 1956 |
| 2,830,528 | Arnett | Apr. 15, 1958 |
| 2,839,988 | Tritt | June 24, 1958 |
| 2,871,874 | Coles | Feb. 3, 1959 |
| 2,898,843 | Rockriver | Aug. 11, 1959 |